(12) United States Patent
Olcese

(10) Patent No.: US 10,104,927 B2
(45) Date of Patent: Oct. 23, 2018

(54) ITEM OF HEADWEAR

(71) Applicant: Jason Olcese, Carpinteria, CA (US)

(72) Inventor: Jason Olcese, Carpinteria, CA (US)

( * ) Notice: Subject to any disclaimer, the term of this patent is extended or adjusted under 35 U.S.C. 154(b) by 120 days.

(21) Appl. No.: 14/861,432

(22) Filed: Sep. 22, 2015

(65) Prior Publication Data

US 2017/0079362 A1    Mar. 23, 2017

(51) Int. Cl.
*A42B 1/00* (2006.01)
*A42B 1/22* (2006.01)
*B29C 45/14* (2006.01)
*B29L 31/00* (2006.01)
*B29L 31/48* (2006.01)

(52) U.S. Cl.
CPC .......... *A42B 1/22* (2013.01); *B29C 45/14336* (2013.01); *B29L 2031/4814* (2013.01); *B29L 2031/7282* (2013.01)

(58) Field of Classification Search
CPC .............. A42B 1/22; B29L 2031/7282; B29L 2031/4814; B29C 45/14336
See application file for complete search history.

(56) References Cited

U.S. PATENT DOCUMENTS

| | | | |
|---|---|---|---|
| 2,775,769 A | 1/1957 | Henschel | |
| 4,941,210 A * | 7/1990 | Konucik | A41D 27/13 2/171 |
| 5,272,772 A * | 12/1993 | Hahn | A42B 1/22 2/195.2 |
| 5,477,563 A * | 12/1995 | Gentes | A42B 3/062 2/411 |
| 5,608,917 A * | 3/1997 | Landis | A42B 3/14 2/11 |
| 5,657,491 A * | 8/1997 | Young | A42B 1/061 2/195.2 |
| 5,715,540 A | 2/1998 | Cho et al. | |
| 5,862,522 A | 1/1999 | Cho | |
| 5,909,803 A * | 6/1999 | Clark | A42B 1/22 2/195.2 |
| 6,089,421 A | 7/2000 | Cho et al. | |
| 6,363,537 B1 | 4/2002 | Park | |
| 6,446,266 B1 | 9/2002 | Park | |
| 7,240,373 B2 | 7/2007 | Ahn et al. | |
| 8,020,219 B2 * | 9/2011 | Jacobsen | A42B 3/066 2/421 |
| D753,905 S * | 4/2016 | Singleterry | D2/891 |

(Continued)

*Primary Examiner* — Khaled Annis
(74) *Attorney, Agent, or Firm* — Lathrop Gage L.L.P.

(57) ABSTRACT

Adjustment mechanisms for items of headwear are disclosed. An adjustment mechanism for an item of headwear includes a first connection member secured to a first side of an opening formed into a backside of the piece of headwear and a second connection member secured to a second side of the opening opposite the first side. The first connection member includes a first plastic portion having a first spine extending from a first base, and a first moldable portion secured to the first plastic portion. The first spine has a plurality of posts. The second connection member includes a second plastic portion comprising a second spine extending from a second base, and a corresponding second moldable portion secured to the second plastic portion. The second spine has a plurality of apertures. A portion of the posts of the first connection member is selectively received into the apertures.

13 Claims, 5 Drawing Sheets

(56) References Cited

U.S. PATENT DOCUMENTS

| | | | |
|---|---|---|---|
| D771,914 S * | 11/2016 | Cho | D2/891 |
| 2005/0193470 A1 | 9/2005 | Nalls | |
| 2011/0283440 A1* | 11/2011 | Higgins | A42C 1/00 2/195.2 |
| 2013/0145519 A1 | 6/2013 | Cho | |
| 2014/0053317 A1 | 2/2014 | Haroutoonian | |
| 2014/0101820 A1* | 4/2014 | Cho | A42B 1/22 2/171 |
| 2016/0021961 A1* | 1/2016 | Lacy | A42B 1/22 2/195.4 |

\* cited by examiner

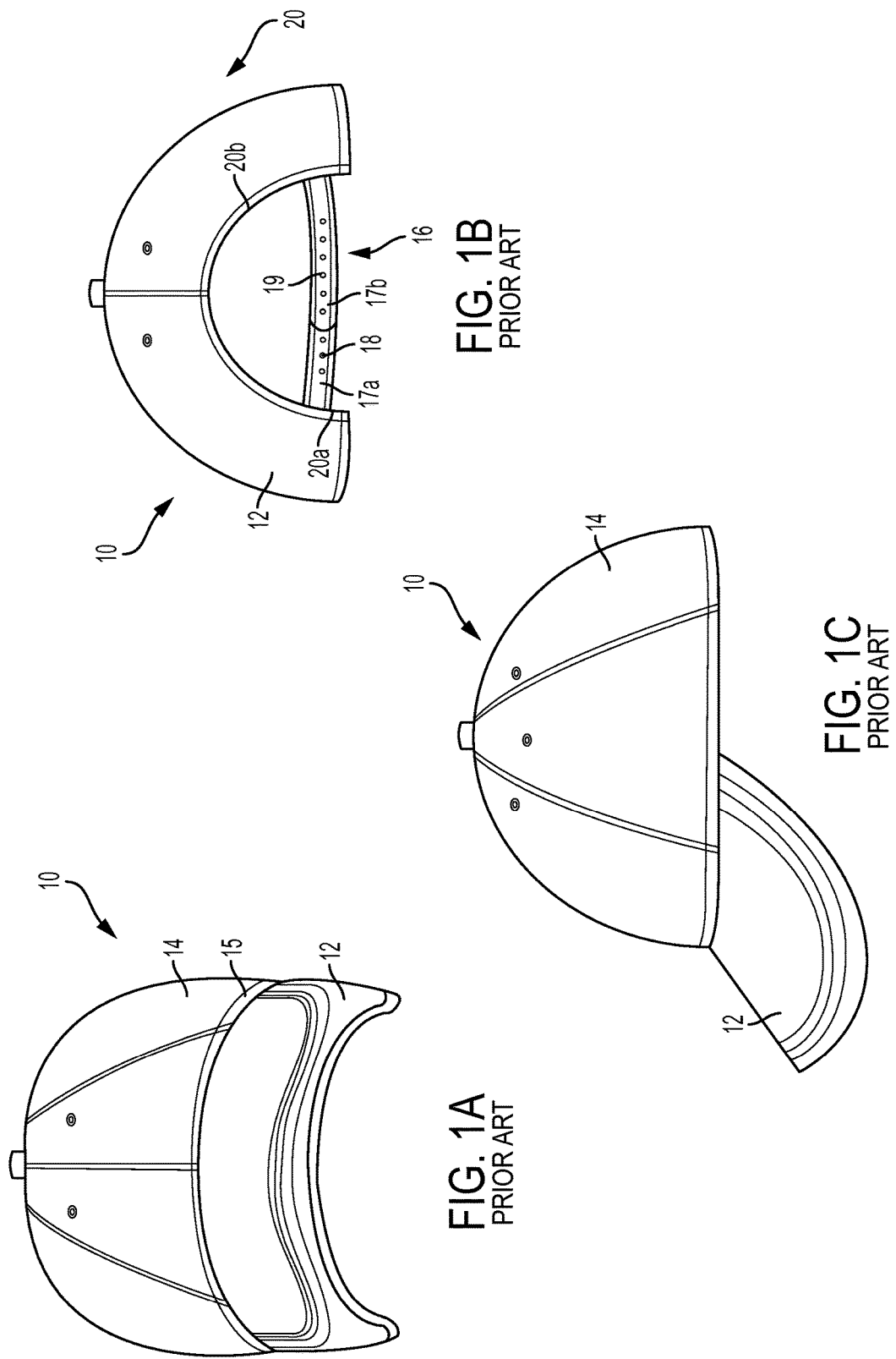

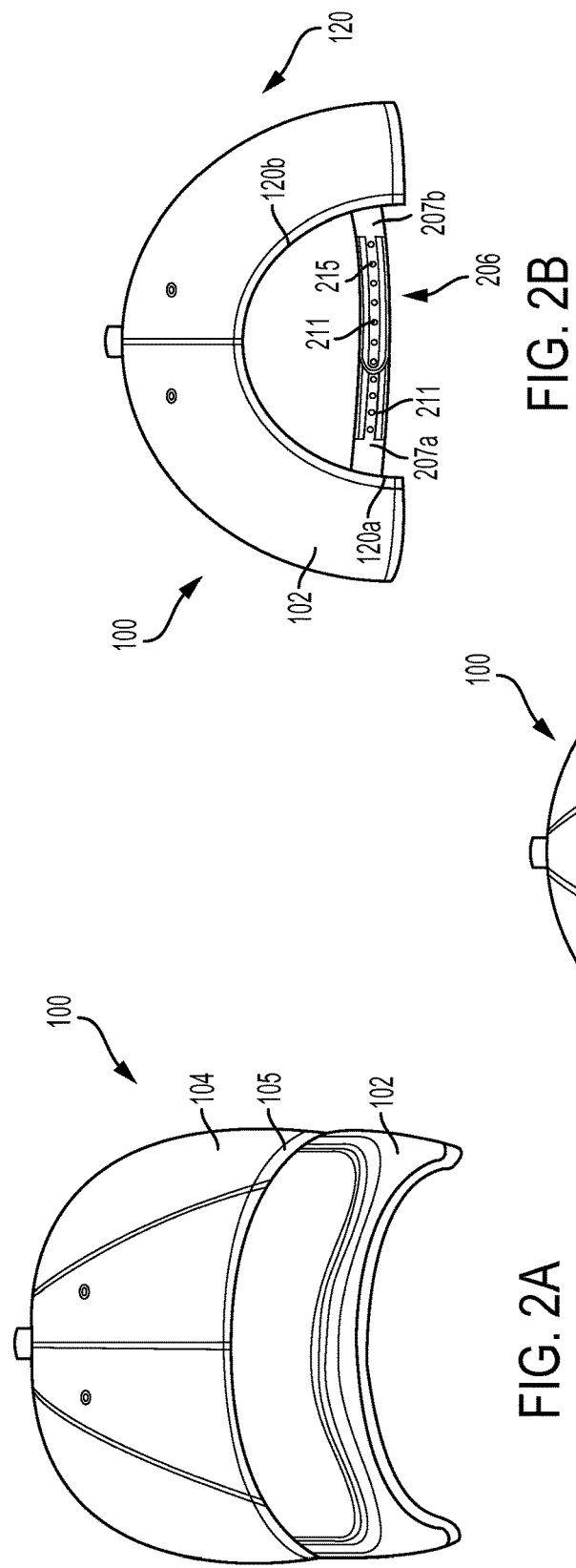

ITEM OF HEADWEAR

BACKGROUND

Baseball caps and other forms of headwear are popular all over the world for people of all ages. To accommodate variations in head circumference and comfort, a single style of headwear must come in a number of different sizes or be adjustable. In an effort to minimize the number of sizes offered, certain types of headwear are equipped with an adjustment mechanism whereby a person wearing the hat can adjust the circumference of the hat based on his or her head size. The current invention relates generally to adjustment mechanisms for headwear, and to headwear having such adjustment mechanisms.

SUMMARY

The following presents a simplified summary of the invention in order to provide a basic understanding of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, an item of headwear includes a visor, a crown, and an adjustment mechanism incorporated into an opening in a back side of the crown. The adjustment mechanism has a first moldable portion that is overmolded to a first plastic portion which forms a first connection member, and a second moldable portion that is overmolded to a second plastic portion to form a second connection member. The first connection member is secured to a first side of the opening on the back side of the crown and the second connection member is secured to a second side of the opening on the back side of the crown, the second side being opposite the first side. And the first connection member is selectively engagable with the second connection member to hold the adjustment mechanism in a closed position.

In another embodiment, an adjustment mechanism for an item of headwear has a first connection member secured to a first side of an opening formed into a backside of the piece of headwear and a second connection member secured to a second side of the opening formed into the backside of the piece of headwear, the second side being opposite the first side. The first connection member has a first plastic portion comprising a first spine extending from a first base, and the first spine has a plurality of posts extending therefrom. A corresponding first moldable portion is secured to the first plastic portion. The second connection member has a second plastic portion comprising a second spine extending from a second base, and the second spine has a plurality of apertures formed therein. A corresponding second moldable portion is secured to the second plastic portion. A portion of the posts of the first connection member is selectively received into the apertures in the second connection member.

In still another embodiment, a process for forming an adjustment mechanism for an item of headwear includes the following steps: a) molding a first plastic portion having a spine extending outwardly from a base, the spine having a plurality of outwardly-extending ribs and a plurality of upwardly-extending posts; b) molding a second plastic portion having a spine extending outwardly from a base, the spine having a plurality of outwardly-extending ribs and a plurality of apertures, the apertures corresponding to the plurality of posts in the first plastic portion; c) placing the first and second plastic portions in respective tooling and providing an overmolding material to the respective tooling, where the overmolding material is allowed to bond with the spine and ribs of the respective first and second plastic portions to form first and second connection members, each connection member having an attachment end and a free end; d) removing the first and second connection members from the tooling; e) securing the attachment end of the first connection member to a first side of an opening in an item of headwear and the attachment end of the second connection member to a second opposing side of the opening in the item of headwear; and f) selectively engaging the free ends of the first and second connection members such that a portion of the posts in the first connection member is received into corresponding apertures in the second connection member.

BRIEF DESCRIPTION OF THE DRAWINGS

FIG. 1a is a front view of a prior art baseball hat.

FIG. 1b is a back view of the prior art baseball hat of FIG. 1 showing an adjustment mechanism.

FIG. 1c is a side view of the prior art baseball hat of FIG. 1.

FIG. 2a is a front view of a baseball hat according to one embodiment of the invention.

FIG. 2b is a back view of the baseball hat of FIG. 2a.

FIG. 2c is a side view of the baseball hat of FIG. 2c.

DETAILED DESCRIPTION

Figure 3A:
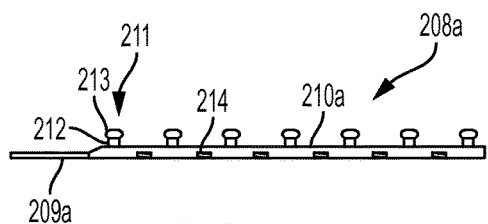
FIG. 3a is a side view of a plastic portion of a first connection member.
Figure 4A:
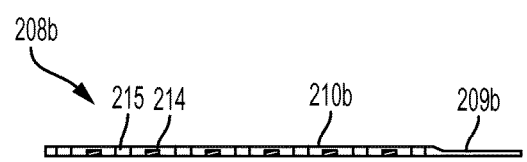
FIG. 4a is a side view of a plastic portion of a second connection member.
Figure 3B:
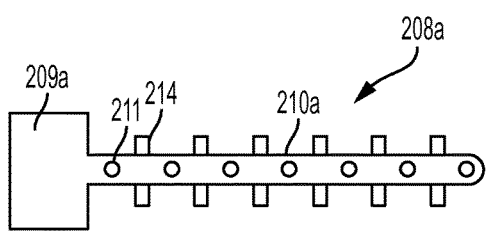
FIG. 3b is a top view of the plastic portion of the first connection member.
Figure 4B:
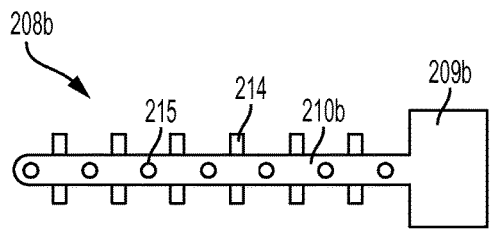
FIG. 4b is a top view of the plastic portion of the second connection member.
Figure 3C:
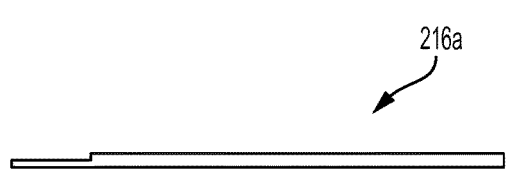
FIG. 3c is a side view of an overmold portion of the first connection member.
Figure 4C:
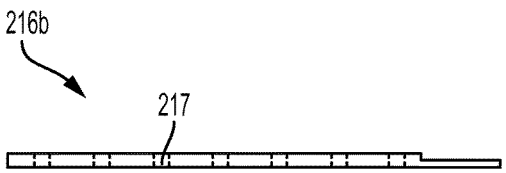
FIG. 4c is a side view of an overmold portion of the second connection member.

Several types of adjustment mechanisms exist for adjusting a circumference of a crown portion of an item of headwear such that the headwear accurately conforms to the circumference of a wearer's head. For example, one such type includes the use of an elastic band that is formed around an inside perimeter of the hat's crown. Often, these hats are available in typical sizes (e.g., small, medium, and large) based on a predetermined range of head circumferences. The elastic band automatically adjusts for variations in head circumference, thus minimizing the number of sizes offered for sale. Another exemplary type of adjustment mechanisms incorporate Velcro straps into an open area in the back of the hat.

FIGS. 1a-1c illustrate a prior art configuration of a baseball hat 10. The baseball hat 10 includes a visor 12, a crown portion 14, and an adjustment mechanism 16. The crown portion 14 is formed of a plurality of textile sections sewn (or otherwise secured) together to form the dome-shaped cap 14. The textile sections may be, for example, woven fabric such as wool or polyester, or more stretchable fabrics such as Lycra, plastic mesh, or rubber. The visor 12 is secured to a front edge 15 of the cap 14 and extends outwardly therefrom. The adjustment mechanism 16 may be of the "snap back" type and may include a first snap member 17a extending from a first side cutout 20a in a backside 20 of the cap 14 and a corresponding second snap member 17b extending from a second side cutout 20b in the backside 20 of the cap 14. Apertures 19 formed in the second snap member 17b may be configured to receive projections 18 formed in the first snap member 17a, and the snap members 17a and 17b adjustably connect first side cutout 20a and second side cutout 20b.

In prior art adjustment mechanisms such as that described directly above, the first and second snap members 17a and 17b, respectively, are constructed of the same hardness (or durometer) of plastic. The hardness of the plastic used for the snap members 17a and 17b is determined based on the desired durability of the adjustment mechanism. The harder the plastic that is used for the adjustment mechanism, the more durable the adjustment mechanism will be, and vice versa. To ensure durability of the adjustment mechanism, hat manufacturers default towards a harder plastic. However, this may increase the wearer's discomfort at the site of contact of the adjustment mechanism with the wearer's head.

Attention is now directed to FIGS. 2a-2c which illustrate various embodiments of an adjustment mechanism 206 (FIGS. 7a and 7b) incorporated into a baseball hat 100 according to the present invention. The baseball hat 100 may be substantially similar to baseball hat 10, except as specifically noted and/or shown, or as would be inherent. For example, visor 102 corresponds generally to the visor 12, crown portion 104 corresponds generally to the crown portion 14, and front edge 105 corresponds generally to the front edge 15, though with any noted or shown deviations. Other types of headwear may also benefit from the incorporation of the adjustment mechanism 206. Thus, while the following description is directed to a baseball hat 100 incorporating the adjustable mechanism 206, it shall be understood that the item of headwear can be any item of headwear into which it is desirable to incorporate an adjustment means to allow for customization of the circumference of the headwear.

Referring now to FIGS. 3a-8, in one embodiment of the invention, the adjustment mechanism 206 comprises a first snap member 207a and a corresponding second snap member 207b (FIGS. 5a-6b). The first and second snap members 207a and 207b may each include a plastic member 208a and 208b and an overmold 216a and 216b, respectively.

With attention now directed to FIGS. 3a, 3b, 4a, and 4b, the plastic member 208a has a base area 209a and a spine 210a extending therefrom. A plurality of posts 211 comprising a column 212 and a spherical head 213 extend upwardly from the spine 210 at predetermined intervals over a distance. Additionally, a plurality of ribs 214 extend perpendicularly from the spine 210a for interacting with the overmold 216a as described below.

The plastic member 208b similarly has a base area 209b and a spine 210b extending therefrom. A plurality of apertures 215 may be formed into the spine 210b for receiving the posts 211 of the plastic member 208a. The apertures 215 are large enough to allow the posts 211 to pass therethrough upon applying an amount of pressure, but small enough that the posts 211 do not automatically retreat back through the apertures 215. Accordingly, the apertures 215 may be formed into the spine 210b at intervals corresponding to the plurality of posts 211. A plurality of ribs 214 may also extend perpendicularly from the spine 210b for interacting with the overmold 216b as described below.

Plastic members 208a and 208b may be molded of a plastic having a durometer similar to traditional adjustment mechanisms such as adjustment mechanism 16. Types of plastics that may be acceptable include but are not limited to polyurethanes, acrylics, polyamides, polyolefins, styrenes, vinyls, et cetera. Especially with the plastic members 207a and 207b made of a similar durometer of plastic as traditional adjustment mechanisms, the desirable durability is maintained.

Overmolds 216a and 216b (FIGS. 3c, 3d, 4c, and 4d) may be formed of a softer durometer material, such as a softer plastic. The overmold material may be, for example, an elastomeric resin such as thermoplastic polyurethane (TPU), styrene-ethylene/butylene-styrene copolymer (SEBS), copolyesters, copolyamides, thermoplastic rubber (TPR), or thermoplastic vulcanite (TPV). SEBS resins may allow for very low durometers (e.g., less than 30 Shore A) and thus may be preferable, although other materials may also be desirable. The overmolds 216a and 216b are respectively fixed to plastic members 208a and 208b, such as through the processes described below.

According to one process for forming the first and second snap members 207a and 207b, the plastic members 208a and 208b are first formed by molding the desired material for the plastic members 208a and 208b according to molding techniques, whether now known or later developed. Once the plastic members 208a and 208b are formed, the overmolds 216a and 216b are attached to the plastic members 208a and 208b according to an overmolding process.

The overmolding process is an injection molding process that falls into a broad category of multimaterial molding. In multimaterial molding, two or more materials with uniquely different properties are incorporated into a single molded component. This allows the molded component to take advantage of the different properties of the two or more materials. During the overmolding process, an overmold is injection molded around a substrate material (in this case, the plastic members 208a and 208b) to complete the single molded component (the snap members 207a and 207b). This injection process may be completed by a multishot process, in which a single press with at least two barrels acts as the injection molding tool, or by an insert molding process, in which the substrate is molded first and then subsequently placed into a different core and cavity to create the volume for the overmold material.

Regardless of the specific overmolding process used, it is critical to achieve a sufficient mechanical or chemical bond between the substrate material and the overmold. For example, use of the insert molding process often requires that the substrate be heated such that the surface temperature is close to the melt temperature of the overmold so as to reach optimum bond strength. Therefore, when selecting materials for the overmolding process, it may be highly desirable for the melt temperature range of the overmold resin to be in the same approximate range as that of the substrate to enhance bonding. If the melt temperature of the overmold is too low to melt the surface of the substrate, then the bond between the substrate and the overmold may be unacceptably weak. However, if the melt temperature is too high, the substrate may become ductile and distorted. It will thus be recognized by those of skill in the art that selecting compatible materials (i.e., materials of similar chemistry or which contain compatible blended components) is critical to ensuring a good bond. Especially if the selected materials for the overmolding process are not compatible, a mechanical interlock may replace the chemical bond.

Figure 3D:
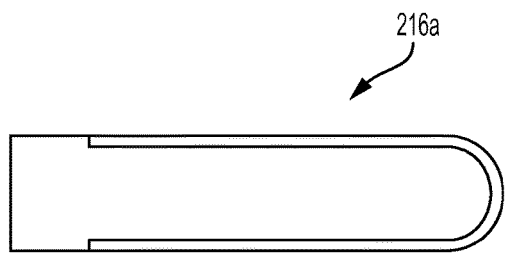
FIG. 3d is a top view of the overmold portion of the first connection member.
Figure 4D:
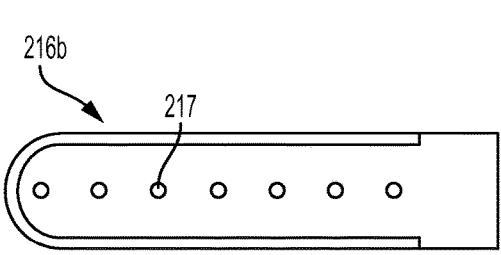
FIG. 4d is a top view of the overmold portion of the second connection member.
Figure 5A:
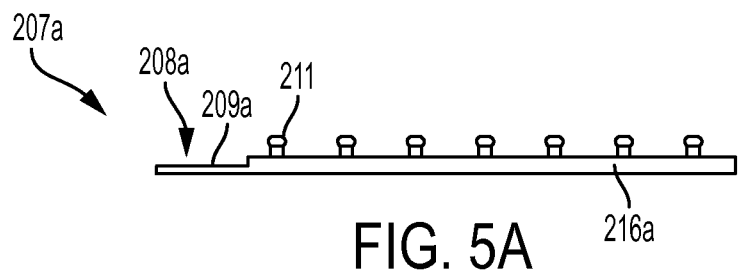
FIG. 5a is a side view of the first connection member incorporating the plastic portion and the overmold portion.
Figure 5B:
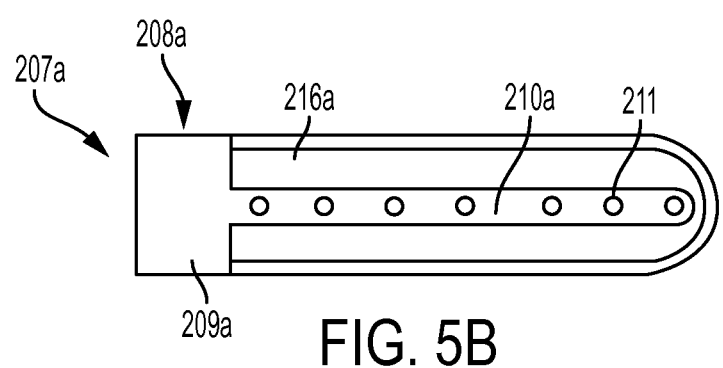
FIG. 5b is a top view of the first connection member incorporating the plastic portion and the overmold portion.
Figure 6A:
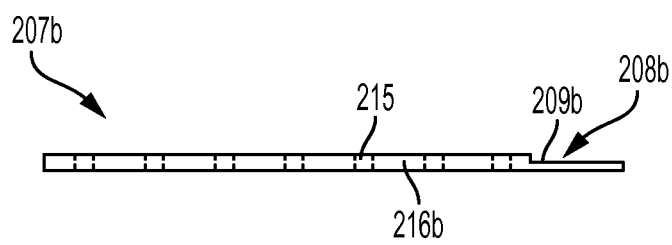
FIG. 6a is a side view of the second connection member incorporating the plastic portion and the overmold portion.
Figure 6B:
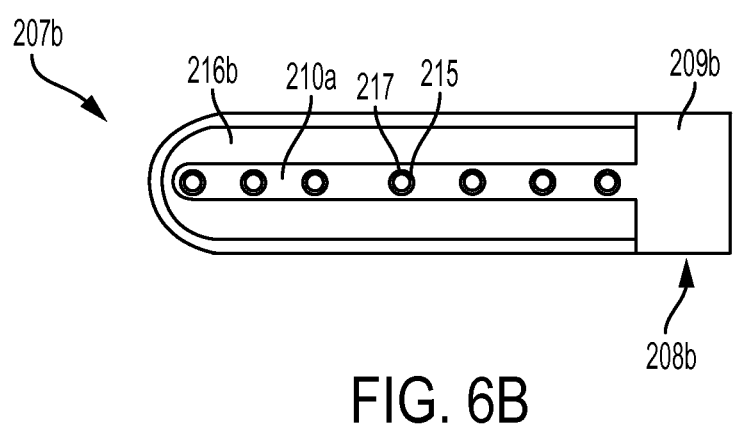
FIG. 6b is a top view of the second connection member incorporating the plastic portion and the overmold portion.

Once the plastic members 208a and 208b are molded into their respective configurations, the plastic members 208a and 208b are placed into respective molding tools which hold the plastic members 208a and 208b in place and are designed to shape the overmold material around the respective plastic member 208a and 208b and into the desired profile. It may be desirable for the overmolds 216a and 216b to have a profile that resembles traditional "snap-back" adjustment means, such as adjustment means 106. FIGS. 3d and 4d illustrate desirable profiles of overmolds 216a and 216b respectively. As illustrated in FIG. 4d, overmold 216b may have a plurality of apertures 217 formed therein which correspond to the apertures in the plastic member 208b.

Figure 7A:
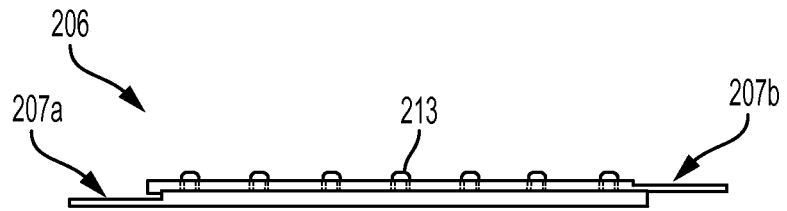
FIG. 7a is a side view of the first and second connection members selectively engaged.
Figure 7B:
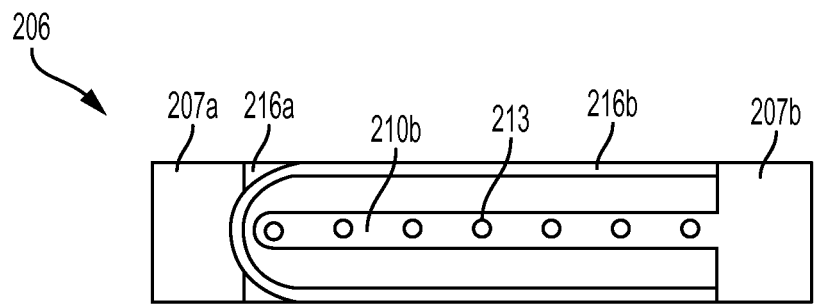
FIG. 7b is a top view of the first and second connection members selectively engaged.

With the plastic members 208a and 208b in place, the overmold material is injected into the molds. The overmold material surrounds the spine 210 and the ribs 214 of the respective plastic member 208a and 208b, which strengthens the bond between the plastic members 208a and 208b and the overmolds 216a and 216b. FIGS. 7a and 7b show the resultant snap members 207a and 207b.

It may be desirable for the final snap members 207a and 207b to have generally the same final dimensions as traditional "snap-back" adjustment mechanisms. However, the overmold material may cause the snap portions 207a and 207b to be thicker than a traditional "snap-back" adjustment mechanism. The posts 211 on the snap portion 207a may therefore be adjusted accordingly so as to fit into the apertures 215 in the snap portion 207b.

Figure 8:
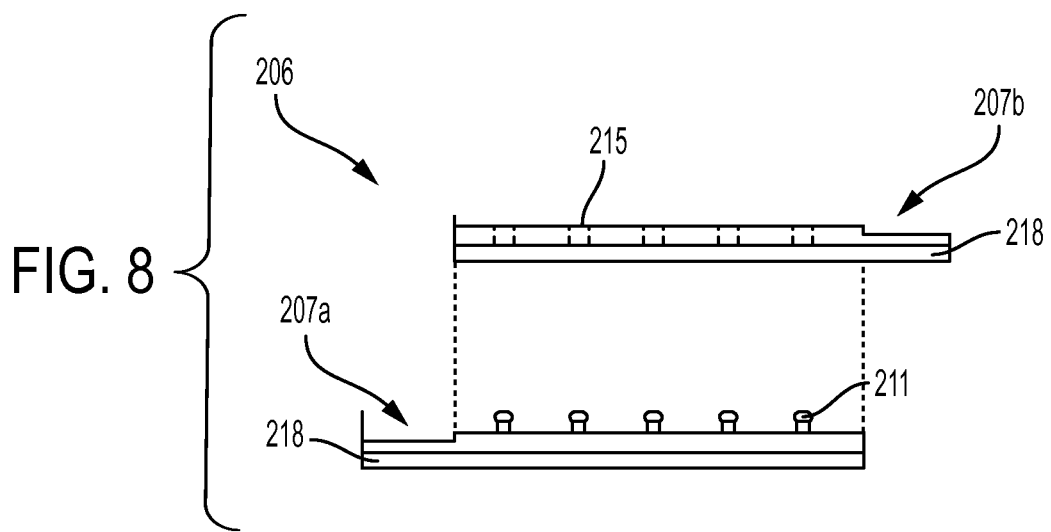
FIG. 8 is a blown up view of the first and second connection members having textile secured thereto.

It may be additionally desirable to affix a textile 218 to the snap member 207a opposite the posts 211 and the corresponding side of snap member 207b, as illustrated in FIG. 8. The textile 218 can be, for example, a moisture wicking, anti-microbial material, or open-celled foam, to provide protection against sweating. The textile 218 would provide an additional layer between the user's head and the snap member 207a creating a more comfortable and hygienic surface. Attachment of the textile 218 to the snap members 207a and 207b may occur through chemical bonding, stitching, or other means of attachment. It may be desirable to provide a stitch channel in the snap members 207a and 207b and which may receive thread for securing the textile 218 to the snap members 207a and 207b.

As illustrates in FIG. 2b, the snap portions 207a and 207b may attach to side cutouts 120a and 120b in the back of the crown 114 as described above regarding baseball hat 10. Snap portion 207a may lie against the head of the person wearing the hat, with the posts 211 extending away from the wearer's head. Snap portion 207b may then be laid atop the snap portion 207a until the posts 211 match up with corresponding apertures 215 in the snap portion 207b according to the circumference of the person's head. The snap portion 207b may then be pressed towards the snap portion 207a until the post heads 213 pass through the apertures 215, thus connecting snap portion 207a and 207b. When the post heads 213 are received by the apertures 215, the hat is in a "closed" position and is suitable for wearing.

To move the had from a "closed" position to an "open" position, for example, to change the circumference of the hat for a new wearer, the snap portion 207b may be pulled away from the snap portion 207a such that the post heads 213 are pulled back through the apertures 215 and snap portions 207a and 207b are detached. The circumference of the hat can then be re-adjusted based on the desired circumference for a wearer's head as detailed above.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

What is claimed is:

1. An item of headwear, comprising:
   a visor;
   a crown; and
   an adjustment mechanism incorporated into an opening in a back side of the crown, comprising:
      a first plastic portion formed of a first material, the first plastic portion having a spine and a plurality of posts extending from the spine in a vertical direction, the posts being spaced apart from one another in a lengthwise direction for a first distance, the first distance being a largest distance that extends from one of the posts to another of the posts, the first plastic portion having a first rib extending laterally from the spine within the first distance;
      a first moldable portion formed of a second material that is different from the first material, the first moldable portion being overmolded to the first plastic portion to form a first connection member, the first moldable portion extending perpendicularly to both the vertical direction and the lengthwise direction along the first distance and encasing the first rib; and
      a second moldable portion overmolded to a second plastic portion to form a second connection member, the second plastic portion having apertures formed therein, the apertures in the second plastic portion corresponding to the posts of the first plastic portion for selectively receiving the posts therein, the second moldable portion having apertures corresponding to the apertures in the second plastic portion;
   wherein the first connection member is secured to a first side of the opening on the back side of the crown;
   wherein the second connection member is secured to a second side of the opening on the back side of the crown, the second side being opposite the first side; and
   wherein the first connection member is selectively engagable with the second connection member to hold the adjustment mechanism in a closed position.

2. The item of headwear of claim 1, wherein the second material is an elastomeric resin selected from the group consisting of: thermoplastic polyurethane (TPU), styrene-ethylene/butylene-styrene copolymer (SEBS), copolyesters, copolyamides, thermoplastic rubber (TPR), and thermoplastic vulcanite (TPV).

3. The item of headwear of claim 1, wherein the first moldable portion is overmolded to the first plastic portion through one of a multi-shot process or an insert molding process.

4. The item of headwear of claim 1, wherein the first connection member further comprises a textile material attached to a face of the first connection member; the textile material being positioned to be located between the posts and a wearer's head, adjacent the wearer's head.

5. The item of headwear of claim 4, wherein the textile material is one of anti-microbial, moisture wicking, and open-celled foam.

6. The item of headwear of claim 4, wherein the second connection member further comprises another textile attached to a face of the second connection member; the another textile being positioned to be located between the apertures in the second plastic portion and the wearer's head, adjacent the wearer's head.

7. The item of headwear of claim 1, wherein the first material has a durometer that is greater than a durometer of the second material.

8. An adjustment mechanism for an item of headwear comprising:
    a first connection member secured to a first side of an opening formed into a backside of the piece of headwear; and
    a second connection member secured to a second side of the opening formed into the backside of the piece of headwear, the second side being opposite the first side;
    wherein the first connection member comprises:
        a first plastic portion comprising a first spine extending from a first base, the first spine having a plurality of posts extending therefrom along a first distance, the first distance being a largest distance that extends from one of the posts to another of the posts, the first plastic portion comprising a first rib extending laterally from the first spine within the first distance; and
        a corresponding first moldable portion secured to the first plastic portion along the first distance and encasing the first spine;
    wherein the second connection member comprises:
        a second plastic portion comprising a second spine extending from a second base, the second spine having apertures formed therein along a second distance, the second plastic portion comprising a second rib extending laterally from the second spine within the second distance; and
        a corresponding second moldable portion secured to the second plastic portion along the second distance and encasing the second spine; and
    wherein a portion of the posts of the first connection member is selectively received into the apertures in the second connection member.

9. The adjustment mechanism of claim 8, wherein:
    in a first position, the portion of the posts selectively received into the apertures is one;
    and in a second position, the portion of the posts selectively received into the apertures is greater than one.

10. The adjustment mechanism of claim 8, wherein the first and second moldable portions are overmolded to the first and second plastic portions, respectively.

11. The adjustment mechanism of claim 10, wherein the moldable material is selected from the group consisting of: thermoplastic polyurethane (TPU), styrene-ethylene/butylene-styrene copolymer (SEBS), copolyesters, copolyamides, thermoplastic rubber (TPR), and thermoplastic vulcanite (TPV).

12. The adjustment mechanism of claim 11, wherein the first connection member further comprises textile secured to a face of the first connection member opposite the posts via stitching or chemical bonding; the textile being positioned to be located between the posts and a wearer's head, adjacent the wearer's head.

13. The adjustment mechanism of claim 12, wherein the textile is one of anti-microbial, moisture wicking, and open-celled foam.

\* \* \* \* \*